United States Patent
LaVigne et al.

(10) Patent No.: US 8,045,550 B2
(45) Date of Patent: Oct. 25, 2011

(54) PACKET TUNNELING

(75) Inventors: Bruce E. LaVigne, Roseville, CA (US); Mark Gooch, Roseville, CA (US); Alan R. Albrecht, Granite Bay, CA (US); Mauricio Sanchez, Roseville, CA (US); Steven G. Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 11/712,706

(22) Filed: Mar. 1, 2007

(65) Prior Publication Data

US 2008/0212579 A1    Sep. 4, 2008

(51) Int. Cl.
*H04L 12/28* (2006.01)
*H04L 12/56* (2006.01)
*H04L 29/06* (2006.01)
*H04J 3/24* (2006.01)
*G06F 15/173* (2006.01)
*G06F 9/00* (2006.01)
*G06F 11/00* (2006.01)

(52) U.S. Cl. ........ 370/389; 370/474; 709/225; 709/239; 713/154; 726/13; 726/23

(58) Field of Classification Search .................. None
See application file for complete search history.

(56) References Cited

U.S. PATENT DOCUMENTS

| | | | |
|---|---|---|---|
| 6,763,018 | B1 | 7/2004 | Puthiyandyil et al. |
| 6,788,681 | B1 * | 9/2004 | Hurren et al. ................ 370/389 |
| 7,103,045 | B2 | 9/2006 | Lavigne et al. |
| 7,111,072 | B1 | 9/2006 | Matthews et al. |
| 7,159,242 | B2 | 1/2007 | Genty et al. |
| 7,769,873 | B1 * | 8/2010 | Mackie .......................... 709/229 |
| 2002/0080804 | A1 * | 6/2002 | Ando et al. .................... 370/401 |
| 2002/0083175 | A1 * | 6/2002 | Afek et al. ..................... 709/225 |
| 2006/0050719 | A1 * | 3/2006 | Barr et al. ...................... 370/401 |
| 2007/0195775 | A1 * | 8/2007 | Glassoway ..................... 370/392 |

* cited by examiner

*Primary Examiner* — Chirag Shah
*Assistant Examiner* — Ashley Shivers

(57) ABSTRACT

Network devices, systems, and methods are provided for packet processing. One network device includes a network chip having a number of network ports for the device. The network chip includes logic to select original data packets, based on a set of criteria, received from or destined to a particular port on the device and to tunnel the selected data packets to a second network device having a different destination address to that of the selected data packets.

20 Claims, 5 Drawing Sheets

PACKET TUNNELING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include an intrusion system (IS), e.g., intrusion prevention system (IPS) and/or intrusion detection system (IDS) that serves to detect unwanted intrusions/activities to the computer network. Unwanted network intrusions/activities may take the form of attacks through computer viruses and/or hackers, misconfigured devices among others, trying to access the network. To this end, an IS can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others.

In previous approaches, to identify suspicious network traffic, data traffic needs to pass through a point of the network where an IS is located. As used herein, "IS" is used to indicate intrusion system(s), i.e., both the singular and plural. An IS can include an intrusion prevention system (IPS) and/or intrusion detection system (IDS), etc. Previously an IS would have been deployed solely as a standalone in-line device (see, FIG. 2A). More recently, the IS has become a shared resource local, e.g., integral, to a network device, e.g., integral to a switch, router, etc. An IDS may be local to a particular network device (see FIG. 2B), however, all network devices in a network may not have an IDS local to the network device. If the IS is not "in-line", e.g., between one port and another in a network packet's intended path, then suspicious activity may not be detected. For large network systems, placing an IS in-line with initial client and/or server attach points, in an intended packet path, can be both expensive to implement and very complex to maintain.

DETAILED DESCRIPTION

Figure 1:
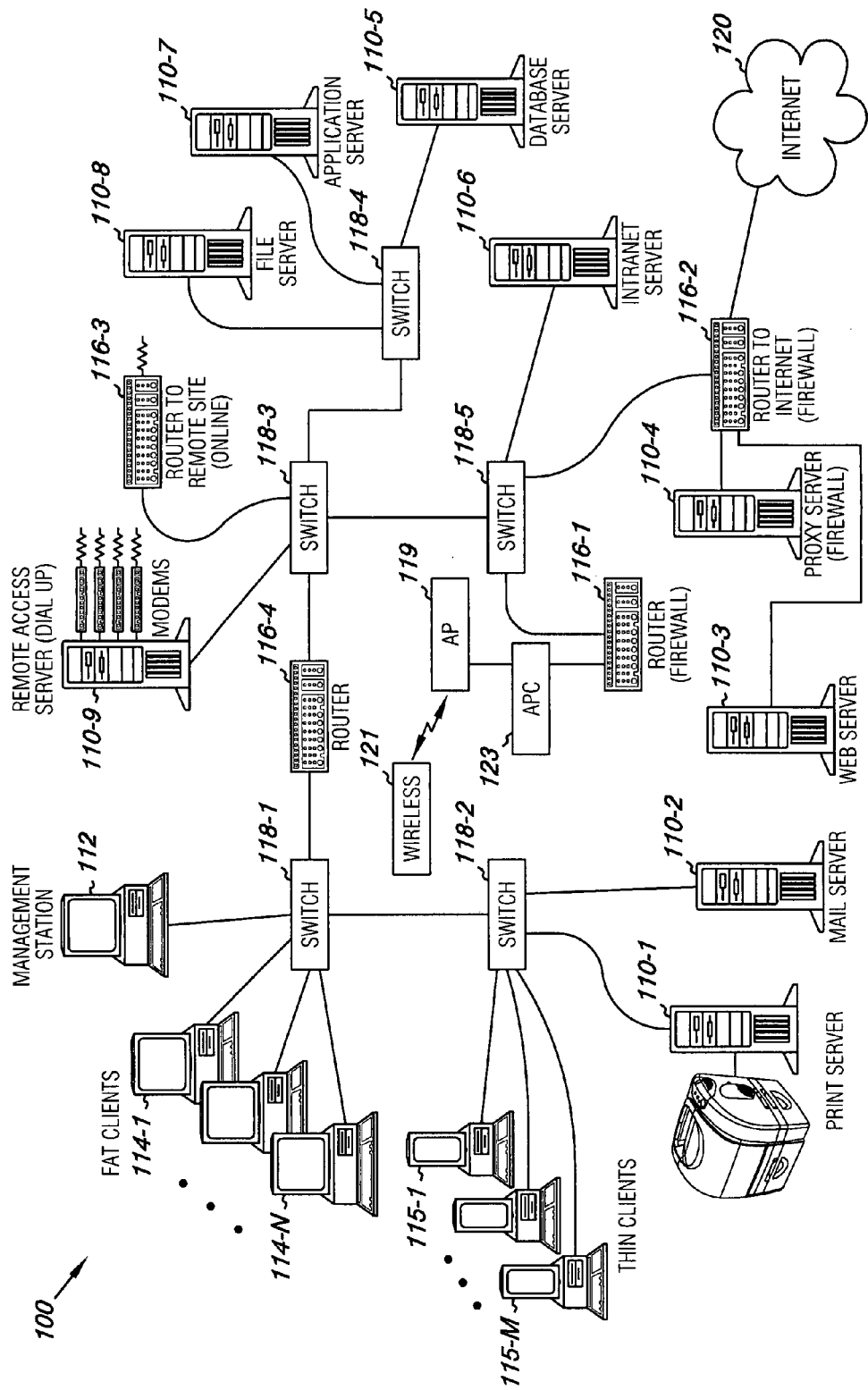
FIG. 1 is an example of a computing device network in which certain embodiments of the invention can be implemented.

Embodiments of the invention may include network devices, systems, methods, and other embodiments, including executable instructions and/or logic. One embodiment is a network device that includes a network chip having a number of network ports for the device. The network chip may include logic to select original data packets received from or destined to a particular port on the device based on a number of criteria. In some embodiments, the number of criteria can include, the IP source address (IP SA), the source port, an IP flow (defined as packet traffic between a particular source IP address and a particular destination IP address), a media access controller (MAC) source address (MAC SA), a media access controller (MAC) destination address (MAC DA), the source VLAN, a traffic type, etc. In some embodiments, the network chip may include logic to transparently tunnel the selected data packets to a second network device having a different destination address to that of the selected data packets, and back again.

In various embodiments, executable instructions and/or logic, e.g. hardware circuitry on an application specific integrated circuit (ASIC), are provided to receive a network packet, including a media access control (MAC) destination address, from a port on a first network device. The instructions and/or logic are operative to encapsulate the network packet to secure tunnel the network packet to a second network device having a MAC destination address different from the MAC destination address of the network packet in a manner that is transparent to the packet and client and/or network device as well.

In one embodiment, instructions and/or logic on the second network device can decapsulate the network packet and send the original network packet to a network appliance, e.g., an IPS, which is not "in-line" with an original path for the network packet and is unaware that it is not in-line with the original path. The network appliance can execute instructions to perform any necessary packet processing, e.g., an IPS may perform security checks on the original packet, and then return the original packet to the second network device. Instructions and/or logic on the second network device can encapsulate the network packet to tunnel the network packet back to the first network device. Instructions and/or logic on the first network device can decapsulate the network packet and forward the network packet by making a forwarding decision based on its original destination address, e.g., MAC destination address, IP destination address, etc.

In various embodiments, instructions and/or logic can select a network packet for encapsulation based on a set of criteria. According to these embodiments, encapsulating the network packet to secure tunnel the network packet to the second network device is performed without requiring the two network devices to be a part of the same subnet or layer 2 broadcast domain. As such, these embodiments provide a mechanism to monitor network traffic with fewer "in-line" systems, e.g., one or two IS can be used to monitor many ports on the network as compared to previously deploying numerous in-line systems or requiring that all traffic from lower devices be sent (as part of the normal traffic forwarding process) through the few network devices with IS attached.

As used herein, a network can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

Although reference is often made to network switches in this disclosure, those skilled in the art will realize that embodiments of the invention may be implemented in other network devices. Examples of other network devices include, but are not limited to, wireless and/or wired routers, switches, hubs, bridges, etc., e.g., intelligent network devices having processor and memory resources.

FIG. 1 illustrates an embodiment of a computing device network 100. As shown in FIG. 1, a number devices can be networked together in a LAN and/or WAN via routers, hubs, switches and the like. As used herein a "network device" means a switch, router, hub, bridge, etc., e.g., a device having processor and memory resources and connected to a network 100, as the same will be understood by one of ordinary skill in the art. Although the term switch will often be used in this disclosure, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, and a remote access server (dial up) 110-9. The examples described here do not provide and exhaustive list of servers that may be used in a network.

The embodiment of FIG. 1 further illustrates a network management station 112, e.g., a server, PC and/or workstation, a number of "fat" clients 114-1, ..., 114-N which can also include PCs and workstations and/or laptops, and a number of "thin" clients 115-1, ..., 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. The term "network" as used herein is not limited to the number and/or quantity of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having logic, e.g., application specific integrated circuits (ASICs), and a number of network ports associated with such logic. By way of example and not by way of limitation, the network management station 112 includes a processor and memory. Embodiments of the various devices in the network are not limited to a number of ports, network chips and/or the type or size of processor or memory resources.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to the base station in a wireless network, as the same will be known and understood by one of ordinary skill in the art. As shown in FIG. 1, the AP 119 can be linked to an access point controller (APC) 123, as the same will known and understood by one of ordinary skill in the art, which connects the AP 119 over a packet switched signal link, e.g. an Ethernet link, to other network devices, e.g., router 116-1.

As one of ordinary skill in the art will appreciate, each network device in the network 100 can be physically associated with a port of a switch to which it is connected. Information in the form of network packets, e.g., data packets can be passed through the network 100. Users physically connect to the network through ports on the network 100. Data frames, or packets, can be transferred between network devices by means of a network device's, e.g., switch's, logic link control (LLC)/media access control (MAC) circuitry, or "engines", as associated with ports on a network device. A network switch forwards network packets received from a transmitting network device to a destination network device based on the header information in received network packets. A network device can also forward packets from a given network to other networks through ports on one or more other network devices. As the reader will appreciate an Ethernet network is described herein. However, embodiments are not limited to use in an Ethernet network, and may be equally well suited to other network types, e.g., asynchronous transfer mode (ATM) networks, etc.

As discussed herein, networks can include an intrusion system (IS) that serves to detect and/or evaluate suspicious activity on the computer network, e.g., network 100. In previous approaches an IS would be placed in-line or within a network device on a network packet's intended path. To protect edge ports the IS would have to be located between clients and the ports of the edge network device (defined in connection with FIG. 3) or within the edge network devices, e.g., edge switches, routers, hubs, etc., and operate in cooperation with a network packets intended path. In this approach many IS would have to be deployed in the network.

Figure 2A:
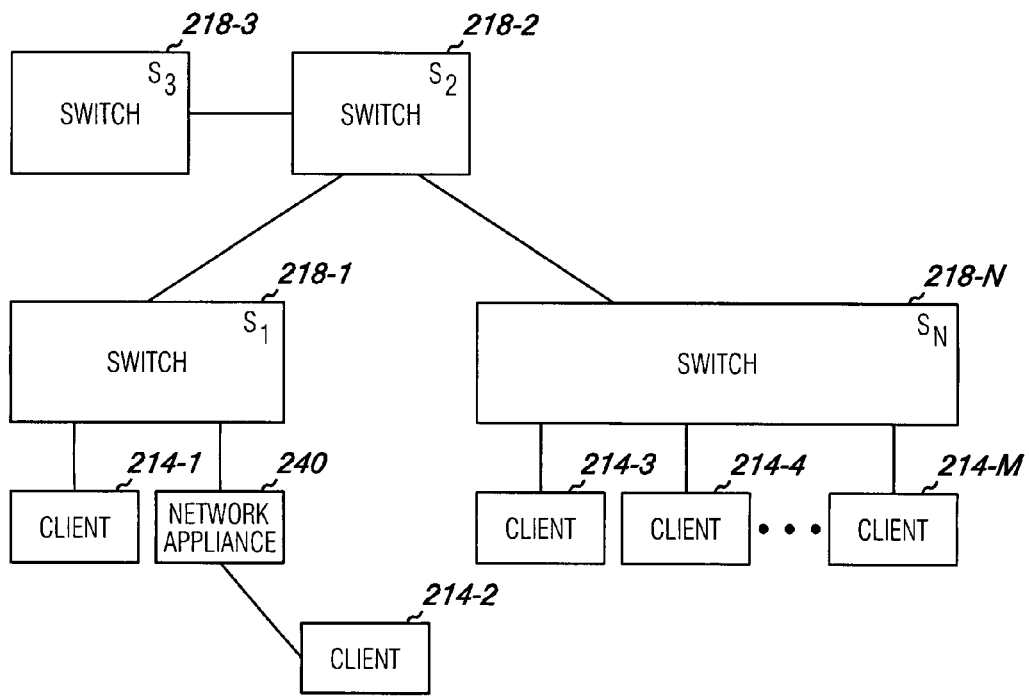
FIG. 2A illustrates a previous approach to placing a network appliance, such as an IS, in-line with a network packet's intended path.

FIG. 2A is a portion of a network such as network 100 shown in FIG. 1. FIG. 2A illustrates a previous approach to placing a network appliance, such as an IS, in-line with a network packet's intended path. FIG. 2A illustrates a number of network devices, 218-1, ..., 218-N, e.g., switches, networked together to connect network traffic, e.g., data packets, between devices in the network. The network traffic may move from a one client, e.g., 214-1, ..., 214-M, to another (source to destination) through a number of network devices. As shown in the embodiment of FIG. 2A a network appliance 240, such as an IS, is located in-line in a network packet's intended path, connected between one port on transmitting (source) network device, e.g., client 214-M, and another port, e.g., a port on switch (S1) 218-1 on the network packet's intended path to other network devices, e.g., switch 218-1, to a destination network device, e.g., client 214-1.

Figure 2B:
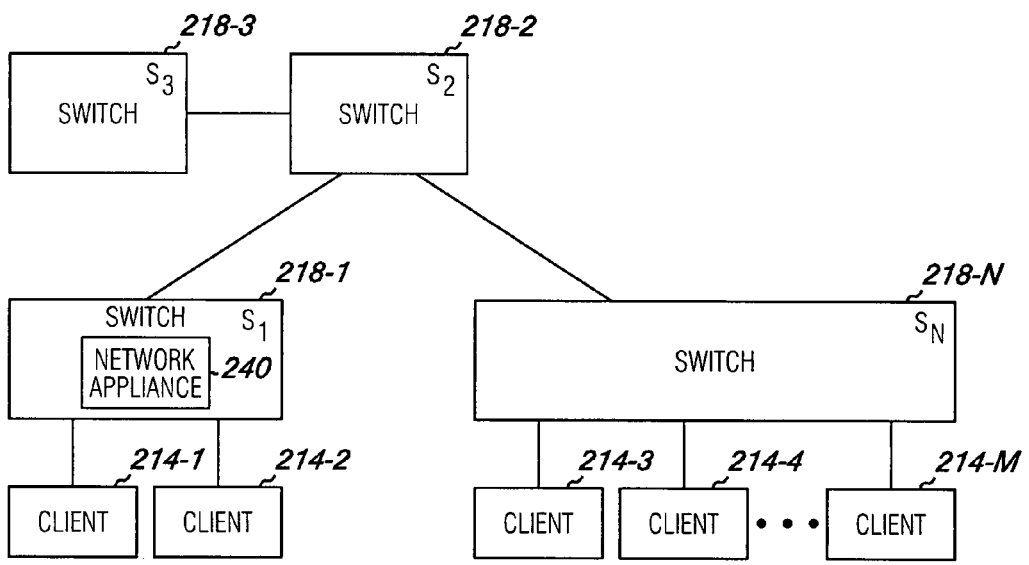
FIG. 2B illustrates an approach to placing a network appliance's functionality in a network device, e.g., a switch, such that it is in-line, with a network packet's intended path.

FIG. 2B illustrates an approach to placing a network appliance's functionality 240 in a network device, e.g., switch 218-1, within, e.g., in-line, with a network packet's intended path. In the example of FIG. 2B, the network appliance's functionality 240 is located as software, hardware, and/or application tool, e.g., as executable instructions and/or logic, within the switch 218-1 which is along a network packet's intended path between a transmitting (source) network device, e.g., client 214-M, and port(s) of a destination network device, e.g., client 214-1.

As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. As the reader will appreciate, a network appliance, e.g., 240 can include processor and memory resources capable of storing and executing instructions to perform a particular role or function. A network appliance can also include one or more network chips (e.g., ASICs) having logic and a number of ports, as the same will be known and understood by one of ordinary skill in the art.

In various embodiments, the network appliance 240 serves as a checking functionality and can be in the form of an intrusion prevention system (IPS), as may be supplied by a third party vendor of network security devices. In certain embodiments, the network appliance 240 can be an intrusion detection system (IDS), or another diagnostic device, accounting device, counting device, etc., as may be supplied by a third party vendor. Embodiments are not limited to the examples given here. The various operations of such different checking functionalities are known and understood by one of ordinary skill in the art.

As the reader will appreciate a network appliance 240, e.g., IS (IPS and/or IDS), can be provided as a program or routine stored in memory and executed on a processor or by logic in association with a network device. An IS can perform functionality to detect suspicious activity, such as denial of service attacks, port scans and attempts to manipulate network devices, by examining network traffic associated with multiple network devices. An IS may do so by reading the incoming and outgoing data packets from a port and performing analyses to identify suspicious data and/or traffic patterns. In some instances, when an IS becomes aware of a potential security breach, it logs the information and can signal an alert to a threat mitigation engine, as the same will be understood by one of ordinary skill in the art. An IS may respond to suspicious activity by dropping suspicious packets, resetting a connection and/or by programming a firewall to block network traffic from a suspicious source. In various IS this may happen automatically or at the command of a network user such as an information technology (IT) administrator.

IS are not limited to inspecting incoming network traffic. Ongoing intrusions can be learned from outgoing or local traffic as well. Some undesirable activity may even be staged from the inside of a network or network segment, and hence the suspicious activity may not be incoming traffic at all. An IS may watch for suspicious activity by examining network communications, identifying heuristics and patterns (often known as signatures) of known suspicious activity types, and providing an alert or taking action when they occur.

As noted above, in previous approaches, in order to fully cover a network an IS would have to be located in-line with network packet traffic. An IS in-line with edge ports could similarly perform the actions described above. Effectively, however, each edge network device would need an IS statically positioned in-line for monitoring network data traffic through the edge ports. For large network systems, having an IS, or other desirable network appliance, in-line at each edge network device to cover network packet traffic through its ports is expensive and complex to maintain.

Embodiments of the present disclosure, in contrast, include network devices, systems, and methods, having executable instructions and/or logic, to tunnel packets on a network. As described next in connection with FIG. 3, embodiments include a network device that includes a network chip having a number of network ports for the device. The network chip includes logic to select original data packets received from or destined to a particular port on the device, based on the number of criteria, and to tunnel the selected data packets to a second network device different from a destination address of the selected data packets.

According to embodiments, network devices being monitored do not each have to include an in-line network appliance, e.g., in-line IS. That is, rather than having an IS at each of the network devices, or achieving less than full network coverage, embodiments of the present disclosure provide an IS at a selected location, or locations, which can be used to receive tunneled, selected data packets to assess data traffic anomalies associated with packets that are not ordinarily passing through ports on a network device associated with the IS.

As the reader will appreciate, various embodiments described herein can be performed by software, application modules, application specific integrated circuit (ASIC) logic, and/or executable instructions operable on the systems and devices shown herein or otherwise. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

Figure 3:
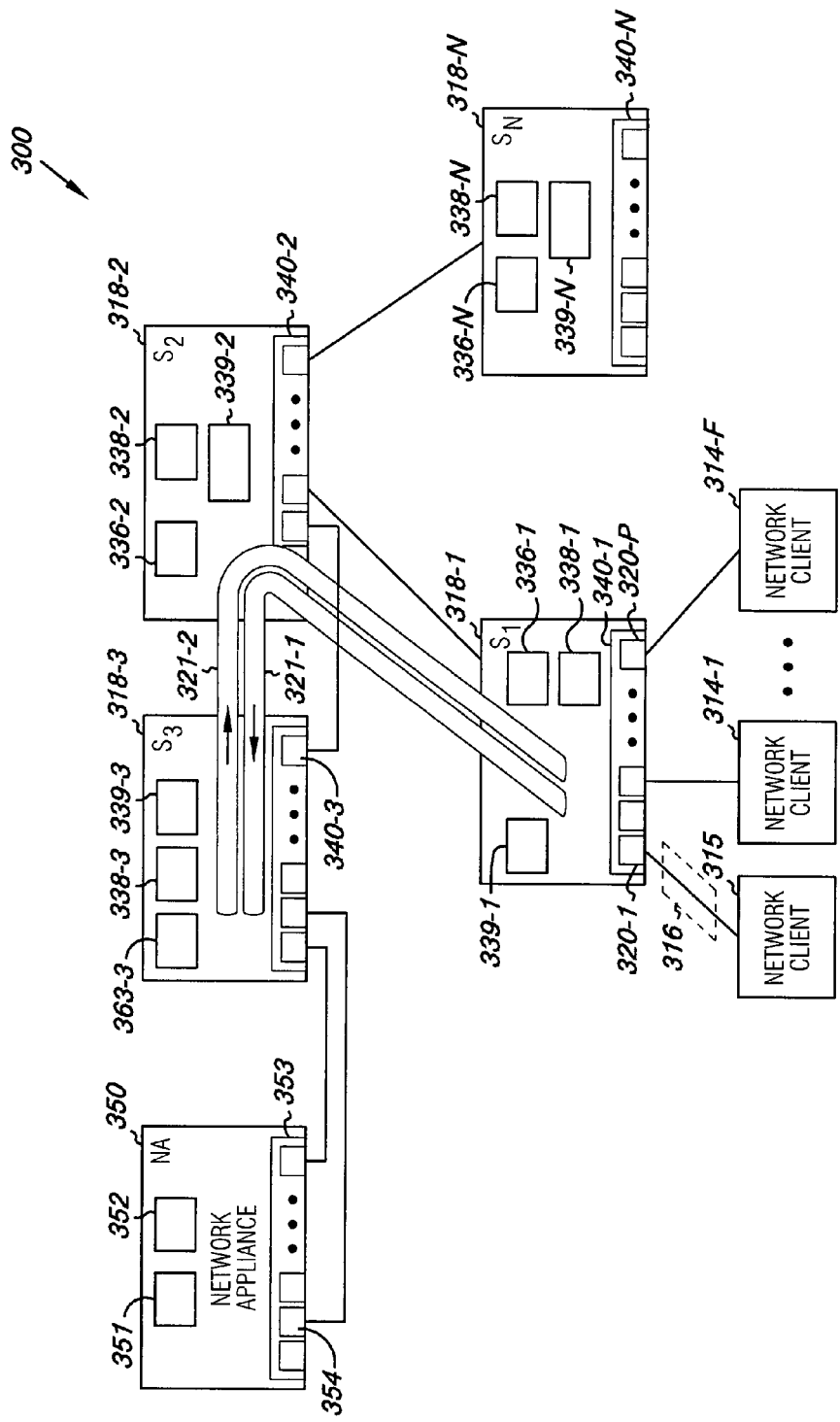
FIG. 3 illustrates various network devices on a network.
Figure 4:
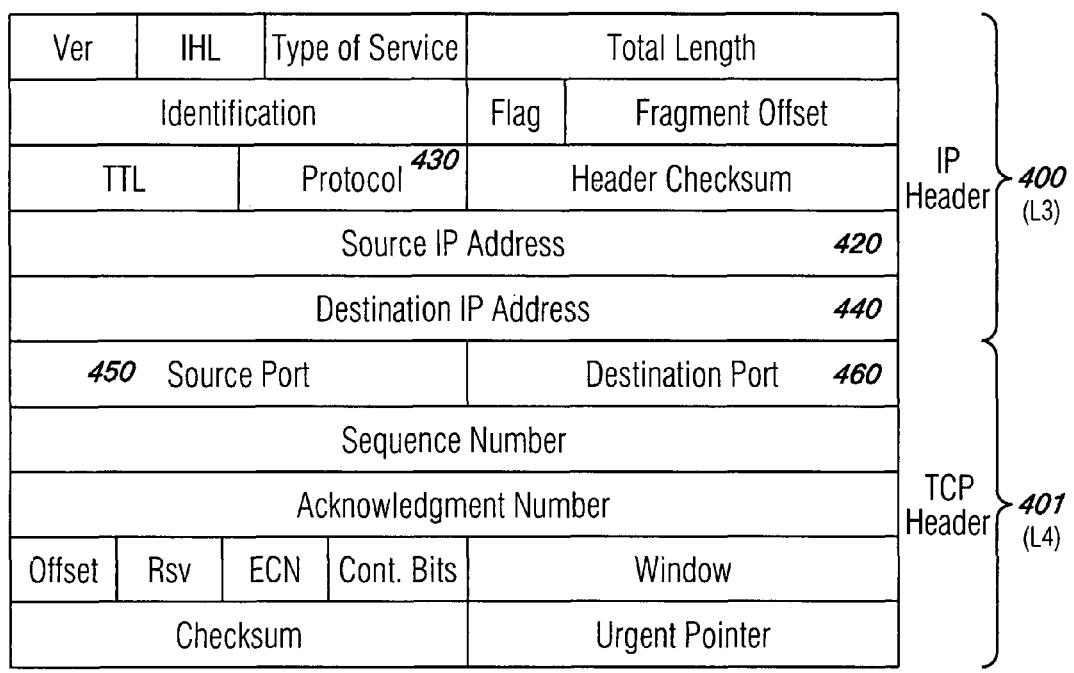
FIG. 4 provides an example illustration of bit definitions for an IP packet, including the fields within an IP and TCP header.
Figure 5:
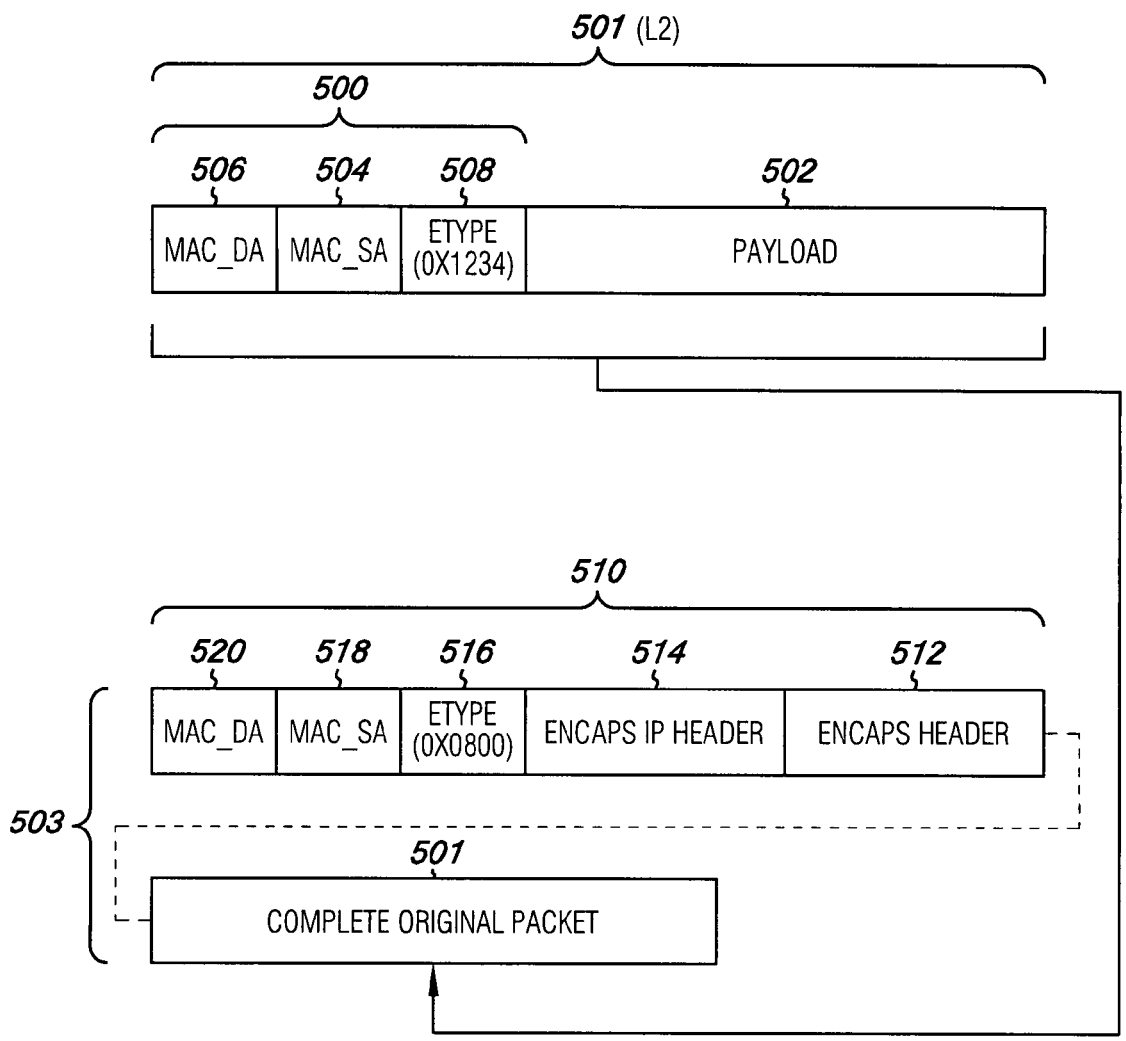
FIG. 5 illustrates a tunnel encapsulation of a packet.

Embodiments of the present invention, however, are not limited to any particular operating environment or to executable instructions written in a particular language or syntax. Software, application modules and/or logic, suitable for carrying out embodiments of the present invention, can be resident in one or more devices or locations or in several devices and/or locations in a network. That is, the embodiments of the present disclosure may be implemented in a stand-alone computing system or a distributed computing system. A "distributed computing network" means the use of multiple computing devices in a network to execute various roles in executing instructions, e.g., application processing, etc. As such, FIGS. 3-5 are intended to provide a context for the description of the functions and operations of embodiments of the present invention. The functions and operations described herein may be performed in one or more of the network devices described herein.

FIG. 3 illustrates a portion 300 of a network, e.g., network 100 shown in FIG. 1, including embodiments of various network devices, 318-1, 318-2, . . . 318-N suited to implement techniques of the present disclosure. Certain devices are referred to as "edge network devices" and other network devices are referred to as "central network devices". As used herein, "edge network devices" means network devices, e.g., 318-1, having ports connected directly to network clients, 315 and 314-1, . . . 314-F. The network clients can include servers, "fat" and "thin" clients, including mobile network clients connected through an APC, etc., as discussed above in connection with FIG. 1. As used herein, "central network devices" means network devices, e.g., 318-3, which are connected to other network devices, e.g., 318-2, but which are not connected directly to network clients, 315 and 314-1, . . . 314-F, 121, etc.

As described in connection with FIG. 1, the various network devices, 318-1, 318-2, . . . 318-N, can include switches, routers, hubs, etc. (shown as switches in FIG. 3). Such network devices, 318-1, 318-2, . . . 318-N, can include processor(s), e.g., 336-1, . . . , 336-N, and memory, e.g., 338-1, . . . , 338-N, resources. The network devices, 318-1, 318-2, . . . 318-N, can similarly include a number of network chips, e.g., 340-1, . . . , 340-N, including logic circuitry (hardware) which can execute instructions and/or logic and each network chip, 340-1, . . . , 340-N, can include a number of network ports, 320-1, 320-2, . . . , 320-P to send and receive data packets (network traffic) throughout the network 300. As mentioned above, the logic circuitry of the number of network chips, e.g., 340-1, . . . , 340-N, can be in the form of an application specific integrated circuit (ASIC) and include logic to serve as a media access controller (MAC).

As shown in FIG. 3, a number of ports 320-1, 320-2, . . . , 320-P can be included on a network chip 340-1, . . . , 340-N and have access to logic circuitry associated with a network chip 340-1, . . . , 340-N and to the processor 336-1, . . . , 336-N and memory 338-1, . . . , 338-N. A crossbar, crosslink, and/or switching fabric 339-1, . . . , 339-N, as the same will be understood by one of ordinary skill in the art, can connect multiple ports 320-1, 320-2, . . . , 320-P between chips 340-1, . . . , 340-N. As used herein, the designators "N", "F" and "P" are used to illustrate that various networks can have a various number of network devices, various numbers of network clients, and various network devices in a network may support or contain a various and/or different number of ports. Embodiments are not limited to the example shown in FIG. 3.

As shown in the embodiment of FIG. 3, a network appliance 350 can be connected to a network device, e.g., 318-3, which may be a central network device. The network appliance 350 could also be a part of switch 318-3. As used herein, the term "network appliance" is used to intend an add-on, e.g., "plug-in", device to a network 300 as contrasted with a "network device" intending a device such as a router, switch, and/or hub, etc., which are sometimes considered more as "backbone" component devices to a network. As shown in FIG. 3, the network appliance 350 can include processor 351 and memory 352 resources capable of storing and executing instructions to perform a particular role or function. The network appliance can also include one or more chips (ASICs), e.g., 353, having logic and a number of ports 354, as the same have been described above.

In various embodiments, the network appliance 350 is an intrusion prevention system (IPS), as may be supplied by a third party vendor of network security devices. In various embodiments, the network appliance 350 can be an intrusion detections system (IDS), another diagnostic device, an accounting device, a counting device, etc., as may be supplied by a third party vendor. Embodiments are not limited to the examples given here. Further, the various operations of such devices will be recognized and understood by one of ordinary skill in the art.

In the embodiment of FIG. 3, a network packet, e.g., data packet, is received from a port, e.g., 320-1, on a network device, e.g., switch 318-1, from a network client, e.g., 315. According to various embodiments, executable instructions and/or logic on the switch 318-1, e.g., instructions and/or logic associated with the hardware of the network chip 340-1, can select original data packets, such as original packet 501 shown in FIG. 5, which are received from or destined to a particular port, e.g., 320-1, on the device 318-1. Instructions and/or logic are executed by the network chip, e.g., 340-1, to tunnel encapsulate selected data packets at layer 2. That is, the entire layer 2 packet is encapsulated. In this manner, the network packet can be encapsulated to secure tunnel the network packet without using the normal forwarding logic employed, e.g., examination of the network packet's destination MAC, IP addresses, etc. According to embodiments, the packet is tunnel encapsulated in a manner that is transparent to the network packet. That is, instructions and/or logic execute to "steal" the packet to another location unbeknownst to normal packet forwarding logic/rules. Encapsulation of the network packet is described further in connection with FIG. 5.

According to various embodiments, the selected data packets are tunnel encapsulated to tunnel (e.g., "steal") the selected data packets to a second network device, which may be a central network device, e.g., switch (S3) 318-3, having a location different (e.g., remote) from an original MAC destination address, e.g., MAC destination address (MAC_DA) 560 as shown in FIG. 5, of the selected data packets. That is, the selected data packets are sent via a secure tunnel to the second network device, e.g., 318-3, rather than forwarding the selected data packets to their original MAC destination address (506 in FIG. 5). As used herein the term "steal" versus "copying" and/or "mirroring" is intended to mean actually forwarding a network packet to a destination different from its intended network path.

FIG. 4 provides an example illustration of bit definitions for an IP packet, including the fields within an IP header 400, e.g., layer 3 header (L3), and TCP header 401, e.g., layer 4 header (L4). As described above in connection FIG. 3, network traffic in the form of packets including headers 400 and 401 can be received from and/or destined to ports on a network device, e.g., 318-1, 318-2, . . . 318-N, such as a switch or router, and can be examined by instructions and/or logic in connection with the logic link control (LLC)/media access control (MAC), or higher layer circuitry associated with the ASIC of a network chip, 340-1, . . . , 340-N. Although various embodiments are described with reference to TCP/IP protocol, one of ordinary skill in the art will appreciate that embodiments are not limited to this example description. That is, packets which are not TCP or even IP may be parsed for fields which are relevant to the particular protocol in use. It is also noted that both the IP and the TCP headers may include optional "options" field making them variable in size, as the same will be known and understood by one of ordinary skill in the art.

In various embodiments, the instructions and/or logic can extract information from the various fields of packet headers, e.g., header 400, 401, and/or MAC header, e.g., layer 2 header (L2) (shown as 500 in FIG. 5), which can be used for purposes such as determining whether packets correspond to the number of criteria, e.g., the source IP address 420, the source port 450, the source VLAN 470, etc. Additionally, the instruction can monitor, based on the IP flow, those packets which meet the criteria by extracting information from the various fields of the IP header which correspond to the IP flow, i.e., the IP source address 420 and the IP destination address 440.

FIGS. 4 and 5 illustrates the numerous header fields that can examined by instructions and/or logic on the network device 318-1, 318-2, . . . 318-N either at the layer 2 data link (MAC) layer or at the layer 3 network (IP) layer or at the layer 4 transport (TCP) layer, or at a layer above the TCP/IP protocol stack, as the same will be recognized by one of ordinary skill in the art. As shown in FIGS. 4 and 5, this TCP/IP header information includes a protocol field 430, a source IP address (IP SA) field 420, a destination IP address (IP DA) field 440, a source TCP/UDP port field 450, and a destination TCP/UDP port field 460, etc.

In various embodiments, the selected data packets are tunnel encapsulated to secure tunnel the network packet without using regular forwarding logic. In various embodiments, the instructions and/or logic can select original data packets according to a set of criteria which may be hard coded into the logic of the network chip, e.g., 340-1. The set of criteria can include information associated with a particular packet and/or particular port or network device selected from the group of packets, (IP) flows, network ports, VLAN membership, MAC SA, MAC DA, etc. In various embodiments, the instructions and/or logic can tunnel the selected data packets to the second network device over a secure tunnel 321-1. One of ordinary skill in the art will appreciate the manner in which a secure tunnel 321 can be realized by executing instructions and/or logic to form the secure tunnel between two network devices, e.g., 318-1 and 318-3. More detail is not provided here so as to not obscure embodiments of the present invention.

According to embodiments, the second network device 318-3 includes logic, e.g., logic on network chip 340-3, to decapsulate the selected data packets, e.g., to decapsulate encapsulated packet 503 shown in FIG. 5, and to send the original data packets, e.g., 501 in FIG. 5, to a network appliance 350. In various embodiments, the second network device 318-3, e.g., central network device, can include logic to forward the decapsulated packet, e.g., original data packet 501, to the network appliance 350 based on addresses within the encapsulation headers 510. That is, logic can choose to forward the decapsulated packet based on the MAC DA 520 within the encapsulation headers 510 or on any combination of the fields in the encapsulation header 510, such as IP source address (IP SA), IP destination address (IP DA) (analogous to 420 and 440 as shown in FIG. 4) within the IP encapsulation header 514, IP protocol (analogous to 430 as shown in FIG. 4) contained in the IP encapsulation header 514. The logic can also identify a key field contained within the encapsulation header 512, etc. In addition, the encapsulation IP header 514 may also include an authentication field, e.g., authentication information, to guarantee the authenticity of the aforementioned addresses.

As described above, the network appliance 350 can include processor 351 and memory 352 resources as well as hardware logic (ASIC) 353 and associated ports 354, as the same has been described herein, to operate on original data packets received from the second network device 318-3. As mentioned above, the network appliance 350 can include a network appliance 350 which is an IPS, supplied by a third party vendor of network security devices or otherwise. In various embodiments, the network appliance 350 can be an intrusion detections system (IDS), another diagnostic device, an accounting device, a counting device, etc., as may be supplied by a third party vendor or otherwise. Embodiments for network appliance 350 are not limited to the examples given here. The various operations of such devices will be recognized and understood by one of ordinary skill in the art.

In various embodiments, the second network device 318-3 includes instructions and/or logic which executes to tunnel encapsulate original data packets, e.g., packet 501 in FIG. 5, returned from the network appliance 350 and to tunnel, e.g., via return tunnel 321-2, the selected data packets back to the network device, e.g., edge network device 318-1, from which the second network device 318-3 originally received the selected data packets. That is, logic can compare a tunnel source identification, e.g., a handle field that has already been inserted into the original packet 501, with a stored table (e.g., list) of valid tunnel identification values to determine the new encapsulation 510 that is used to return tunnel encapsulate the original packet 501. One example of the determination, use, and operation of a handle field is described in co-pending, commonly assigned U.S. patent application Ser. No. 11/788,179, entitled "Marked Packet Processing," by the same inventors, filed Apr. 19, 2007. The same is not described more fully herein so as not to obscure embodiments of the present invention. According to various embodiments a valid tunnel identification value includes at least an IP source address within an encapsulation IP header 514 (IP SA from the forward tunnel 321-1, becoming IP DA in the reverse tunnel 321-2). However, the valid tunnel identification value may also include explicit authorization information in the encapsulation IP header information 514, and possibly also information from the encapsulation header 512, e.g., a key field.

The network device 318-1 includes instructions and/or logic to decapsulate encapsulated packet 503 shown in FIG. 5, returned from the second network device 318-3. According to various embodiments, the network device 318-1 includes instructions and/or logic which can send the original data packets, e.g., 501 in FIG. 5, to the destination address, 506, of the original data packets, e.g., of original data packet 501 in FIG. 5. That is, instructions and/or logic execute to recompose the original data packet and provide the same to normal forwarding logic on the network device 318-1 so the network packet can be forwarded in its original format "unaware" that it has been stolen to and operated upon by the network appliance 350. The original network packet, 501 in FIG. 5, will act, behave, and be operated upon as if it was just received to the network device 318-1, e.g., from client 315. One example of the restoration of the original packet properties, e.g., physical source port (450 in FIG. 4), etc., is described in co-pending, commonly assigned U.S. patent application Ser. No. 11/784,664, entitled "Locating Original Port Information," by the same inventors, filed Apr. 9, 2007. The same is not described more fully herein so as not to obscure embodiments of the present invention. Instructions and/or logic will also recognize if a given packet has already been checked, i.e., inspected and/or "cleared", so as not to return the packet to be checked once again in duplicative fashion.

In previous applications for tunneling packets, a network packet would be sent through a tunnel as a part of the normal forwarding process, e.g., layer 2 (L2) bridging, or, more commonly, layer 3 (L3) routing. That is, in the case of IP routing, a next-hop route in the IP routing table would point to a tunnel. In contrast, tunnel embodiments described in the present disclosure are not used to form part of the normal forwarding path. That is, according to embodiments of the present disclosure, this ingress and egress from the tunnel are not a part of the regular forwarding process, and thus could be considered to be "transparent" to the network packet. Again, the original network packet, e.g., 501 in FIG. 5, will act, behave, and be operated upon as if it had just been received from a particular port, e.g., 320-1, on the network device 318-1 from a given network client, e.g., 315.

The description above includes embodiments in which the network appliance 350 is also unaware that the selected data packets have been "stolen" to the network appliance 350. An alternative embodiment includes an embodiment in which the network appliance 350 is aware that the selected data packets have been stolen to the network appliance 350. In this embodiment the network appliance 350 can include instructions and/or logic which can receive the tunnel encapsulated selected data packets from the network device 318-1. In this embodiment the tunnel 321-1 is not terminated on the second network device 318-3, and tunnel 321-2 is not originated on the second network device 318-3, but rather both tunnels 321-1 and 321-2 extend to the network appliance 350.

In this embodiment instructions and/or logic on the network appliance 350 can decapsulate the selected data packets to the original data packets, e.g., 501 in FIG. 5, prior to operating thereupon, e.g., processing. Effectively, in these embodiments, the network appliance 350 can perform a secure virtualization of the location of the network appliance 350 within the network, i.e., identify which port of which network device, e.g., 320-1, from which it is interacting and receiving selected data packets, as if it were in-line, e.g., "virtually in-line" 316 in FIG. 3, between the original client 315 and the switch 318-1. Additionally, the network appliance 350 could, post processing, execute instructions and/or logic to tunnel encapsulate original data packets 501 to return tunnel, e.g., via 321-2, the selected data packets back to the network device, e.g., edge network device 318-1, from which the network appliance 350 received the selected data packets. This secure virtualization and return tunnel encapsulation requires the network appliance 350 to maintain a switch port identification handle (e.g., IP source address of the encapsulating IP header 514, along with key information in the encapsulation header 512) with the original data packet as it is being processed. This can allow the network appliance 350 to both perform the secure virtualization, and can also be used to form a part of the encapsulation 510 of the return tunnel, i.e., the destination IP address of the return encapsulation IP header 514.

FIG. 5 illustrates a tunnel encapsulation of a selected data packet according to embodiments of the present disclosure. As represented by the illustration in FIG. 5, instructions and/or logic on a given network device can receive a network packet 501 from a port on a particular, e.g., first, network device. As shown in FIG. 5, the network packet will include a payload 502, e.g., the data content, and header information 500. As illustrated in FIG. 5 the header information 500 can include a source MAC address 504 (MAC_SA), a destination MAC address 506 (MAC_DA), and can include Ethernet type information 508, among other information. Hence, in FIG. 5, network packet 501 represents an original data packet received from or destined to a port on a network device from another network device and/or network client, e.g., from port 320-1 on device 318-1 from client 315 as described in connection with FIG. 3. Again, selected data packets can be chosen according to a number of criteria. According to various embodiments, the number of criteria can include, the source IP address (IP SA), the source port, an IP flow (defined as packet traffic between a particular source IP address and a particular destination IP address), a media access controller (MAC) source address (MAC SA), a media access controller (MAC) destination address (MAC DA), the source VLAN, a traffic type, etc., in order to capture a subset of data packets received from or destined to any particular port, e.g., traffic to servers, http traffic, all TCP traffic, all traffic to "off-site" addresses, all IP traffic, etc.

As described herein, embodiments include instructions and/or logic on a network device, e.g., chip 340-1 on device 318-1 in FIG. 3, to encapsulate the original received data packet 501 to secure tunnel the network packet to a second network device having a MAC destination address different from the MAC destination address of the original received data packet 501. As illustrated in the embodiment of FIG. 5, the instructions and/or logic can encapsulate the original received data packet 501 with new packet header information 510 to create tunnel encapsulated packet 503. The new packet header information 510 can include an encapsulation header 512, such as a generic routing encapsulation (GRE) header. Other encapsulation header 512 examples include Ethernet-within-IP (RFC3378), Layer 2 Tunneling Protocol (L2TP-RFC3931), etc. The new packet header information 510 can also include an encapsulation internet protocol (IP) header 514, an Ethernet type header 516, a source MAC address 518 (MAC_SA), and a destination MAC address 520 (MAC_DA), among other encapsulation header information.

As described herein, embodiments also include instructions and/or logic on a network chip of a network device, e.g., chip 340-3 on device 318-3, and/or software and/or logic on a network appliance, e.g., 350 in FIG. 3, to decapsulate a selected network packet and to re-encapsulate the selected network packet as appropriate to send, receive, operate upon, and/or resend the selected network packet.

Accordingly, embodiments, as the same have been described herein, include instructions and/or logic which can steal a network packet to another network device and/or network appliance, e.g., an IPS, which is not "in-line" with an original path for the network packet in a manner which is transparent to the network packet. That is, the stolen packet does not involve normal forwarding logic in which a network packet would be "aware" of the fact that it was being placed in or had just exited from a tunnel. In some embodiments, a network appliance is also unaware that it is not in-line with the original path. In other embodiments, the network appliance may be aware that the packet has been stolen and operate in concert therewith handling a secure virtualization of the network location from which the packet was stolen. The instructions and/or logic can tunnel the network packet between network devices, e.g., via a secure tunnel. Once returned to the network device to which the network packet was originally received the packet will act, behave, and be operated upon as if it had just been received by the network device on the original port. Instructions and/or logic will also recognize if a given packet has already been checked, i.e., inspected and "cleared", so as not to return the packet to be checked once again in duplicative fashion.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
 a network chip including logic and a number of network ports for the device for receiving and transmitting packets therefrom, at least one of the network ports directly connected to a network client; and
 wherein the logic is to:
  select original data packets, based on a set of criteria,
  tunnel encapsulate the selected original data packets to tunnel the encapsulated data packets to a second network device having a different destination address than an original destination address of the selected original data packets, wherein the second network device is connected to a network appliance, and receive the selected original data packets back from the second network device following processing on the selected original data packets by the network appliance, wherein the selected original data packet is tunnel encapsulated,
    decapsulate the tunnel encapsulated data packets received from the second network device, and
    send the selected original data packets to the original destination address of the selected original data packets.

2. The network device of claim 1, where the logic is to select the original data packets based on a set of criteria selected from the group consisting of:
    a physical source port;
    a source media access controller (MAC) address;
    a destination media access controller (MAC) address;
    a source IP address (IP SA);
    a destination IP address (IP DA);
    a protocol ("traffic") type;
    a TCPIUDP source port number;
    a TCPIUDP destination port number; and
    an IP flow.

3. The network device of claim 1, wherein the logic is to tunnel the selected original data packets to the second network device over a secure tunnel.

4. The network device of claim 1, wherein the second network device includes logic to decapsulate the encapsulated data packets and to send the decapsulated original data packets to the network appliance.

5. The network device of claim 4, wherein the network appliance is an intrusion prevention system.

6. The network device of claim 4, wherein the network appliance is a packet accounting device.

7. The network device of claim 4, wherein the second network device includes logic to tunnel encapsulate the selected original data packets returned from the network appliance and to tunnel the encapsulated data packets back to the network device from which the second network device originally received the encapsulated data packets.

8. A network, comprising:
    a network client;
    a first network device directly connected to the network client;
    a second network device having ports to receive data packets from the first network device;
    a network appliance connected to the second network device, said network appliance comprising an intrusion detection system; and
    wherein the first network device includes:
        a network chip including logic and a number of network ports for the device for receiving and transmitting packets therefrom; and
        wherein the logic is to:
            select original data packets, based on a set of criteria, tunnel encapsulate the selected original data packets to secure tunnel the encapsulated data packets to the second network device prior to sending the selected original data packets to an original media access control (MAC) destination address,
            receive the selected original data packets back from the second network device following processing on the selected original data packets by the network appliance, wherein the selected original packet is tunnel encapsulated,
            decapsulate the tunnel encapsulated data packets received from the second network device, and
            send the selected original data packets to the original MAC destination address of the original data packets.

9. The network of claim 8, wherein the logic is to secure tunnel the selected data packets directly to the network appliance.

10. The network of claim 9, wherein the network appliance includes logic to decapsulate the selected data packets.

11. The network of claim 8, wherein the second network device includes logic to:
    decapsulate the selected data packets;
    compare a tunnel source identification to a list of valid tunnel identification values to identify spoofing; and
    send the decapsulated data packets to the network appliance.

12. The network of claim 11, wherein the second network device includes logic to:
    determine return information based on the tunnel source identification;
    tunnel encapsulate the selected original data packets returned from the network appliance and to tunnel the encapsulated data packets back to the first network device from which the second network device originally received the selected original data packets.

13. A method for processing packets, comprising:
    receiving a network packet from a port on a first network device, the network packet including a media access control (MAC) destination address, the first network device directly connected to a network client;
    encapsulating the network packet to secure tunnel the network packet to a second network device having a MAC destination address different from the MAC destination address of the network packet in a manner that is transparent to the network packet, wherein encapsulating the network packet comprises encapsulating the network packet in response to selecting the network packet based on a set of criteria;
    receiving the selected original data packet back from the second network device following processing on the selected original data packets by a network appliance, wherein the selected original data packet is tunnel encapsulated;
    decapsulating the tunnel encapsulated data packets received from the second network device; and
    sending the selected original data packets to the original MAC destination address.

14. The method of claim 13, wherein the method includes sending the network packet to the network appliance.

15. The method of claim 13, wherein the method includes using logic on the second network device to decapsulate the encapsulated network packet and to send the decapsulated network packet to the network appliance, wherein the network appliance is not in-line with an original path for the network packet and is unaware that it is not inline with the original path.

16. The method of claim 15, wherein the network appliance is an intrusion prevention system and the method includes dropping a suspicious packet.

17. The method of claim 15, wherein the network appliance is an intrusion prevention system and the method includes:
    returning the network packet to the second network device; and
    encapsulating the network packet on the second network device to tunnel the network packet back to the first network device.

18. The method of claim 17, wherein the method includes:
using logic on the first network device to decapsulate the network packet; and
forwarding the network packet to its original MAC destination address.

19. The method of claim 13, wherein the method includes:
using logic to select the network packet for encapsulation based on a set of criteria; and
encapsulating the network packet to secure tunnel the network packet without using regular forwarding logic.

20. A network device, comprising:
a network chip including logic and a number of network ports for the device for receiving and transmitting packets therefrom; and
wherein the logic is to select original data packets, based on a set of criteria, is to tunnel encapsulate the selected original data packets to tunnel the encapsulated data packets to a second network device having a different destination address from an original destination address of the selected original data packets, wherein the second network device is connected to a network appliance;
wherein the second network device includes logic to decapsulate the encapsulated data packets and to send the selected original data packets to the network appliance;
wherein the second network device includes logic to tunnel encapsulate the selected original data packets returned from the network appliance and to tunnel the selected data packets back to the network device from which the second network device originally received the selected data packets;
wherein the network device includes logic to decapsulate the selected data packets returned from the second network device and to send the selected original data packets to the original destination address of the selected original data packets; and
wherein the network device includes logic to recognize whether the selected original data packets have already been sent to the network appliance so as not to resend the selected original data packets to the network appliance.

\* \* \* \* \*

UNITED STATES PATENT AND TRADEMARK OFFICE
CERTIFICATE OF CORRECTION

| | |
|---|---|
| PATENT NO. | : 8,045,550 B2 |
| APPLICATION NO. | : 11/712706 |
| DATED | : October 25, 2011 |
| INVENTOR(S) | : Bruce E. LaVigne et al. |

It is certified that error appears in the above-identified patent and that said Letters Patent is hereby corrected as shown below:

In column 13, line 21, in Claim 2, delete "TCPIUDP" and insert -- TCP/UDP --, therefor.

In column 13, line 22, in Claim 2, delete "TCPIUDP" and insert -- TCP/UDP --, therefor.

Signed and Sealed this
Twenty-fifth Day of September, 2012

David J. Kappos
*Director of the United States Patent and Trademark Office*